UNITED STATES PATENT OFFICE.

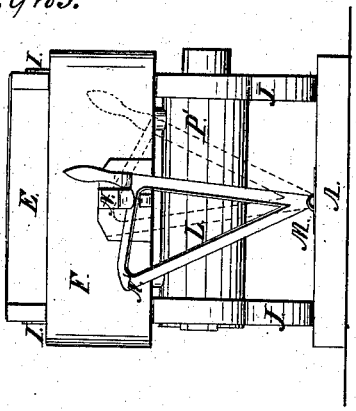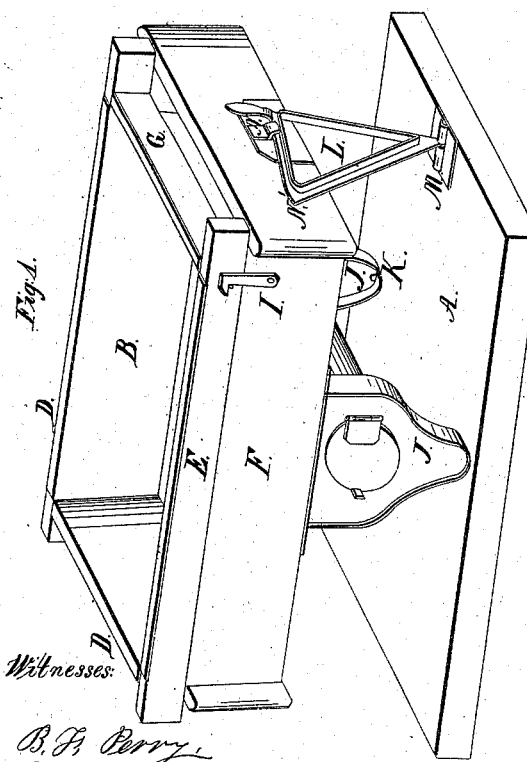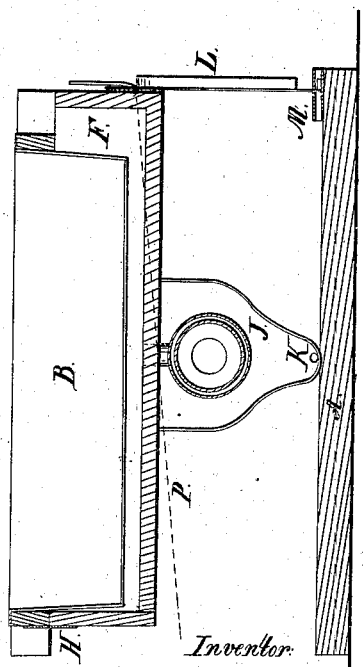

C. M. WILKINS, OF WEST ANDOVER, OHIO.

CHEESE-VAT OPERATOR.

Specification of Letters Patent No. 31,925, dated April 2, 1861.

*To all whom it may concern:*

Be it known that I, C. M. WILKINS, of West Andover, in the county of Ashtabula and State of Ohio, have invented certain new and useful Improvements in Cheese-Vats; and I do hereby declare that the following is a full and complete description of the construction and operation of the same, reference being had to the accompanying drawings, making a part of this specification, in which—

Figure 1 is a perspective view, Fig. 2 is a front end view, Fig. 3 is a longitudinal vertical section.

Like letters refer to like parts in the different views.

My improvement relates to the arrangement of certain devices, in combination with a cheese vat, by the means of which the said vat may be the more easily and with greater facility tipped for the purpose of wheying off.

A, Fig. 1, is the floor or platform upon which the vat stands, and to which it is secured.

B, is the milk vat placed or hung by the rim D, in the frame E.

F, is the water vat in which the milk vat B, is suspended by the frame E. It will be perceived that the water vat is a little longer than the milk vat, causing thereby a space or opening G, at the end of the vat. This space is for the purpose of pouring in the water by which the milk is to be heated. The milk vat is attached to the water vat, by the hinge H, Fig. 3, which joint admits of the milk vat being turned up, in order to give access to the water for cleansing or other purposes.

I, I, are hooks by which the two vats are held together.

J, J, are rockers or legs upon which the vats are supported, the ends being pinned to the floor A, by the pins K, K, which pass through the flanges constituting the rim of the rockers or legs. The pins by their not fitting tightly in the flanges, allow the legs a rocking movement, at the same time preventing them from sliding in any direction.

L, is the sliding lever and handle, by which the vats are held in position, and for tipping them, for wheying off, the end of the lever being secured to the floor by the pivot joint M, allowing it to be drawn backward or forward in a right line, with the ends of the vats.

N, is a clutch reaching over the lever, thereby holding the upper end securely, and serving as a slide through which the edge of the lever moves to the right or left. The position of the lever is shown in Figs. 1 and 2, which holds the vat in a horizontal position. On changing the position of the lever by drawing it to the right, by the handle, the end of the vat is tipped upward, by the inclination of the angle N', of the lever; from a line with the end of the vat, as indicated by the dotted line P, in Fig. 3. The position of the lever is also shown by the dotted line P', in Fig. 2, when the vat is tipped.

In the ordinary way, this tipping of the vat, for the purpose of wheying off, is attended, with much difficulty and labor. Vats usually have six legs, one pair at the end, being swing legs, it often happens on account of the great weight of the vats occasioned by their being filled with water and for that reason, the swing legs cannot be easily removed, owing to the floor having sprung beneath the central pair of legs, by the greater weight of the vats at that point, hence the swinging legs bind upon the floor, and as before stated, it sometimes requires much labor to remove them, but in my arrangement, this difficulty is obviated, for the vats are as easily tipped when full, as they are when empty.

The space or opening G, as indicated is one of peculiar advantage, for the filling of the water vat. In the ordinary vat this is accomplished by the means of a funnel, but by this arrangement, it is effected with greater ease and facility, besides its being a greater convenience, and as cheap, for a vat constructed in this manner costs but little more, than an ordinary vat, the difference of expense being met by the additional expense of a funnel.

The peculiar advantages then, of my vat over others are: first, the greater ease and facility of tipping it, for the purpose of wheying off, and secondly, the greater convenience of filling the water vat, by means of the opening caused by the water vat being constructed of greater length, than the milk vat.

What I claim as my improvement and desire to secure by Letters Patent is—

The hinged rockers J, J, in combination with the hinged lever L, operating as and for the purpose specified.

C. M. WILKINS.

Witnesses:
SELA C. MERRELL,
B. F. PERRY.